(12) United States Patent
Kuo et al.

(10) Patent No.: US 11,237,569 B2
(45) Date of Patent: Feb. 1, 2022

(54) ENHANCED CARGO TRANSPORTATION SYSTEM

(71) Applicant: Ford Global Technologies, LLC, Dearborn, MI (US)

(72) Inventors: James Yu-Hsin Kuo, Farmington Hill, MI (US); Daniel Tang, Pudong New District (CN); Chelsia Ka Po Lau, Ann Arbor, MI (US); Jack Li, Putuo (CN); Euishik Bang, Huangpu (CN)

(73) Assignee: Ford Global Technologies, LLC, Dearborn, MI (US)

( * ) Notice: Subject to any disclaimer, the term of this patent is extended or adjusted under 35 U.S.C. 154(b) by 547 days.

(21) Appl. No.: 16/087,635

(22) PCT Filed: Jul. 26, 2016

(86) PCT No.: PCT/US2016/043969
§ 371 (c)(1),
(2) Date: Sep. 22, 2018

(87) PCT Pub. No.: WO2017/164914
PCT Pub. Date: Sep. 28, 2017

(65) Prior Publication Data
US 2019/0113935 A1 Apr. 18, 2019

Related U.S. Application Data

(60) Provisional application No. 62/312,061, filed on Mar. 23, 2016.

(51) Int. Cl.
*G05D 1/02* (2020.01)
*G06Q 50/28* (2012.01)
(Continued)

(52) U.S. Cl.
CPC .............. *G05D 1/0276* (2013.01); *B60P 1/00* (2013.01); *G01C 21/3407* (2013.01);
(Continued)

(58) Field of Classification Search
CPC .......... G05D 1/0276; B06P 1/00; B60P 3/007; B60P 1/48–1/486; B60P 1/6463–1/6472;
(Continued)

(56) References Cited

U.S. PATENT DOCUMENTS 3,904,064 A 9/1975 Looker
6,543,983 B1 * 4/2003 Felder ...................... B23Q 7/10
414/331.07
(Continued)

FOREIGN PATENT DOCUMENTS

WO 2008101650 A2 8/2008
WO 2014080389 A2 5/2014
WO WO-2017085316 A1 * 5/2017 ........... G06Q 10/087

OTHER PUBLICATIONS

Healthyfatboy, DIY Drones: "Ground/Air Drone Delivery" <http://diydrones.com/profiles/blogs/ground-air-drone-delivery> (<https://web.archive.org/web/20140828071243/http://diydrones.com/profiles/blogs/ground-air-drone-delivery> captured on Aug. 28, 2014). (Year: 2014).*

(Continued)

*Primary Examiner* — Michael P Harrington
*Assistant Examiner* — Brian A Tallman
(74) *Attorney, Agent, or Firm* — Brandon Hicks; Bejin Bieneman PLC (57) ABSTRACT

A vehicle includes a body, a removable cab, a cargo movement subsystem, and a computing device. The removable cab is attachable to the body. The computing device includes a processor and a memory. The computing device is programmed to actuate at least one vehicle subsystem to move (Continued)

the vehicle to deliver cargo stored in the cab and the cargo movement subsystem move the cargo. The cargo movement subsystem is arranged to move the cargo from the cab to a position accessible from an exterior of the vehicle.

15 Claims, 11 Drawing Sheets (51) Int. Cl.
| | |
|---|---|
| *G06Q 10/08* | (2012.01) |
| *G06Q 50/30* | (2012.01) |
| *B60P 1/00* | (2006.01) |
| *G01C 21/34* | (2006.01) |
| *G05B 19/4155* | (2006.01) |
| *G07C 5/00* | (2006.01) |
| *G06Q 10/04* | (2012.01) |
| *B60P 3/00* | (2006.01) |

(52) U.S. Cl.
CPC ....... *G05B 19/4155* (2013.01); *G06Q 10/083* (2013.01); *G06Q 10/0832* (2013.01); *G06Q 10/08355* (2013.01); *G06Q 50/28* (2013.01); *G06Q 50/30* (2013.01); *B60P 3/007* (2013.01); *G05B 2219/37375* (2013.01); *G06Q 10/047* (2013.01); *G07C 5/00* (2013.01)

(58) Field of Classification Search
CPC ............ G01C 21/3407; G05B 19/4155; G06Q 10/047; G06Q 10/083; G06Q 10/0832; G06Q 10/08355; G06Q 50/28; G06Q 50/30; G07C 5/00
USPC ........................................................ 705/332
See application file for complete search history.

(56) References Cited

U.S. PATENT DOCUMENTS

| | | | |
|---|---|---|---|
| 6,789,860 B1 | 9/2004 | Depietro et al. | |
| 9,256,852 B1* | 2/2016 | Myllymaki | ............. B60P 3/007 |
| 9,535,421 B1* | 1/2017 | Canoso | ................ G05D 1/0248 |
| 9,552,564 B1* | 1/2017 | Martenis | ................ G07C 5/008 |
| 2006/0116923 A1 | 6/2006 | Woods et al. | |
| 2008/0133052 A1* | 6/2008 | Jones | ................... G05D 1/0088 |
| | | | 700/245 |
| 2009/0062975 A1 | 3/2009 | Strzeletz | |
| 2011/0046778 A1* | 2/2011 | Pinney | ...................... G07F 9/02 |
| | | | 700/236 |
| 2013/0238121 A1 | 9/2013 | Davey et al. | |
| 2014/0136414 A1* | 5/2014 | Abhyanker | .......... G06Q 10/087 |
| | | | 705/44 |
| 2015/0006005 A1 | 1/2015 | Yu et al. | |
| 2015/0086312 A1* | 3/2015 | Ohnesorge | .............. B60R 11/06 |
| | | | 414/462 |
| 2015/0321595 A1* | 11/2015 | Hempsch | ............. G06Q 10/083 |
| | | | 414/812 |
| 2016/0026968 A1 | 1/2016 | Fan et al. | |
| 2017/0011340 A1* | 1/2017 | Gabbai | ............ G06Q 10/08355 |

OTHER PUBLICATIONS

M.Brian, "Domino's has built an autonomous pizza delivery robot" <https://www.engadget.com/2016-03-18-dominos-autonomous-pizza-delivery-vehicle.html>, Mar. 18, 2016, engaget. (Year: 2016).*

Notification of Transmittal of International Search Report and Written Opinion of the International Searching Authorigy dated Oct. 20, 2016 regarding International Application No. PCT/US2016/43969 (16 pages).

Victoria Woollaston, "Mail Online, Transport for the 21st Century: Cargo 'Blimps', self-Driving Boats and Solar-Powered Trikes Among Entries for Vehicle Design Award", published on Jun. 26, 2015 and retrieved on Mar. 22, 2016 from Internet URL: http://www.dailymail.co.uk/sciencetech/article-3139223/Transport-21st-century-Cargo-blimps-self-driving-boats-solar-powered-trikes-entries-vehicle-design-awards (9pages).

Self-Driving Workplaces Commute to You, retrieved on Mar. 22, 2016 from Internet URL: http://www.dezeen.com/2014/11/26/ideo-self-driving-driverless-vehicles-car-21st-century-mules-cody-truck-wow-pod-work/ (7 pages).

* cited by examiner

ENHANCED CARGO TRANSPORTATION SYSTEM

CROSS REFERENCE TO RELATED APPLICATIONS

This patent application claims priority to and all advantages of U.S. Provisional Patent Application 62/312,061, titled "ENHANCED CARGO TRANSPORTATION SYSTEM", filed Mar. 23, 2016, which application is hereby incorporated herein by reference in its entirety.

BACKGROUND

Delivery vehicles transport cargo to drop-off locations throughout a city. Cargo is typically loaded into the delivery vehicles and delivered based on a predetermined delivery route without input from cargo recipients. The vehicles may leave cargo for the recipients to collect at a later time. A vehicle's planned delivery route may make it difficult to accommodate specific timing needs and/or locations of cargo recipients. Current vehicles lack integrated mechanisms for managing and delivering cargo according to the specific timing needs and/or locations of the cargo recipients.

DETAILED DESCRIPTION

A cargo transportation system can include one or more cargo transportation vehicles. A cargo transportation vehicle includes a computing device programmed to receive one or more requests to deliver one or more items of cargo, e.g., one or more packages, and respective times and/or locations, and to determine a route for the vehicle based on the request(s). Cargo receivers send the requests to the vehicle, e.g., via a "cloud" server, with a preferred time and location to receive the receiver's expected cargo. The computing device actuates vehicle subsystems to move the vehicle to one or more locations according to the respective requests, and actuates a cargo moving subsystem to move the cargo from the vehicle to the recipients. The vehicle may include a body and a cab attachable to the body for storing the cargo. A first cab may be removed cargo placed therein has been delivered, and further can be replaced with a second cab with additional cargo, e.g., packages, for the vehicle to deliver. Thus, the vehicle may deliver cargo at locations and the times preferable to the recipients. Advantageously, the present system can minimize or prevent cargo from being left unattended.

As used herein, the term "cargo" refers to any physical object that can be transported by a transportation vehicle as disclosed herein. Cargo is often referred to herein as a "package," or "packages," i.e., items that can be sent to a recipient, e.g., a parcel, a box, etc., as is known.

Figure 1:
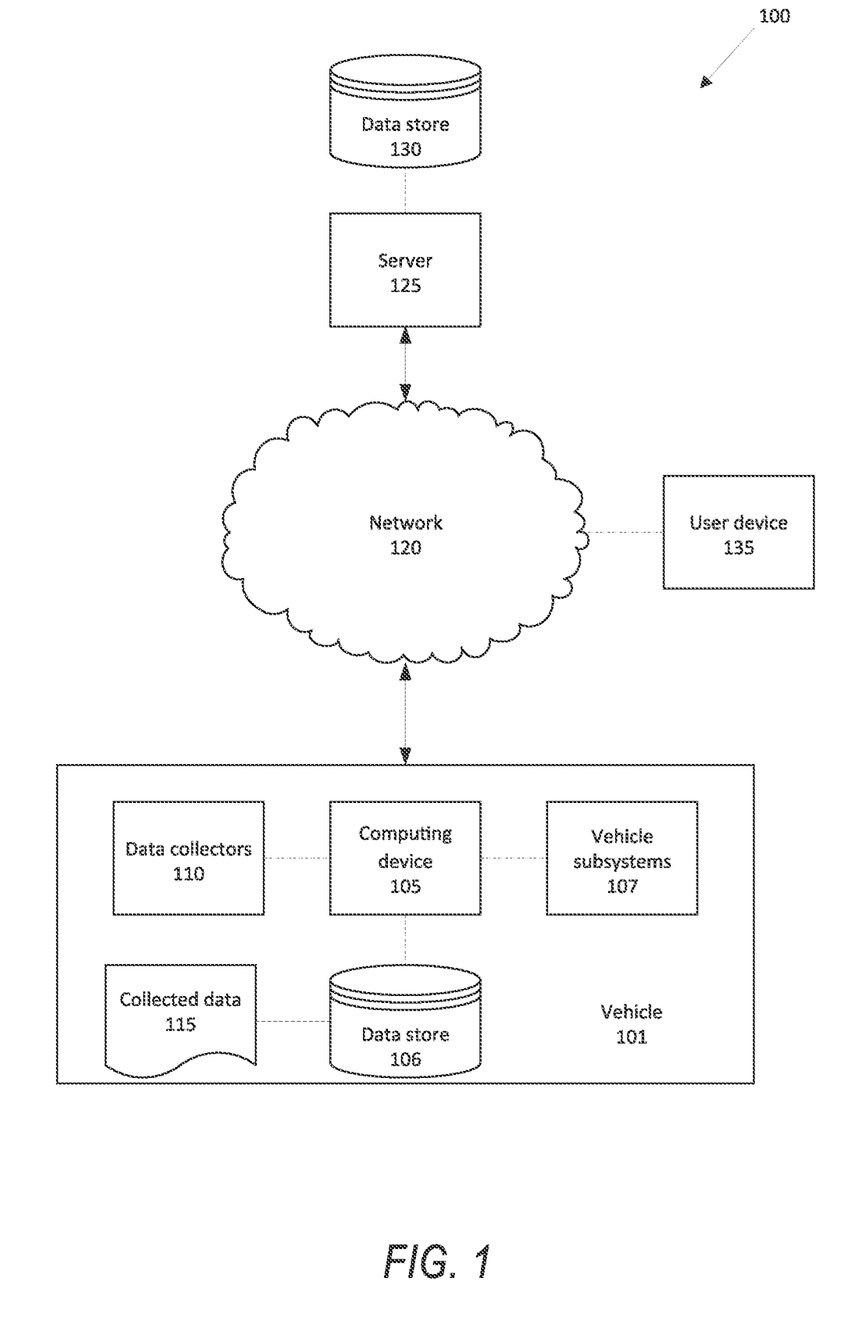
FIG. 1 is a block diagram of an example cargo transportation system including at least one vehicle.

FIG. 1 illustrates a system 100 for delivering an item of cargo, e.g., a package, 150. A computing device 105 in the vehicle 101 is programmed to receive collected data 115 from one or more data collectors 110, e.g., vehicle 101 sensors, concerning various data 115 related to the vehicle 101. For example, vehicle 101 data may include location of the vehicle 101, location of a cargo recipient, etc. Location data may be in a known form, e.g., geo-coordinates (latitude and longitude coordinates) obtained via a navigation system, as is known, that uses the Global Position System (GPS). Further examples of data 115 can include measurements of vehicle 101 systems and components, e.g., a location of the cargo in the vehicle 101, a vehicle 101 velocity, a vehicle 101 trajectory, etc.

The computing device 105 is generally programmed for communications on a vehicle network or communications bus, as is known. Via the network, bus, and/or other wired or wireless mechanisms (e.g., a wired or wireless local area network in the vehicle 101), the computing device 105 may transmit messages to various devices in a vehicle 101 and/or receive messages from the various devices, e.g., controllers, actuators, sensors, etc., including data collectors 110. Alternatively or additionally, in cases where the computing device 105 actually comprises multiple devices, the vehicle network or bus may be used for communications between devices represented as the computing device 105 in this disclosure. In addition, the computing device 105 may be programmed for communicating with the network 120, which, as described below, may include various wired and/or wireless networking technologies, e.g., cellular, Bluetooth, wired and/or wireless packet networks, etc.

The data store 106 may be of any known type, e.g., hard disk drives, solid-state drives, servers, or any volatile or non-volatile media. The data store 106 may store the collected data 115 sent from the data collectors 110.

The vehicle 101 may include a plurality of subsystems 107. The subsystems 107 control vehicle 101 components, e.g., a vehicle seat, mirror, tiltable and/or telescoping steering wheel, etc. The subsystems 107 include, e.g., a cargo movement subsystem 107a, a propulsion subsystem, etc. The computing device 105 may actuate the subsystems 107 to control the vehicle 101 components, e.g., to move the vehicle 101 to a stop to deliver the cargo 150, to move the cargo 150 to a recipient, etc.

The computing device 105 may be programmed to operate some or all of the subsystems 107 with limited or no input from a human operator, i.e., autonomously. Such programming may be referred to as the "virtual operator." The virtual operator includes programming to monitor and/or control one or more subsystems 107, e.g., to provide instructions, e.g., via a vehicle 101 communications bus and/or to electronic control units (ECUs) as are known, to actuate vehicle components, e.g., to apply brakes, change a steering wheel angle, etc. When the computing device 105 operates a subsystem 107 autonomously, this means that the computing device 105 ignores at least some input from the human operator with respect to the subsystem(s) 107 selected for control by the virtual operator. For example, if the human operator attempts to press a gas pedal during virtual operator propulsion operation, the computing device 105 may ignore the human-entered command to increase throttle and accelerate the vehicle 101 according to its programming. Thus, the virtual operator may operate the vehicle 101 to deliver the cargo without the human operator.

Data collectors 110 may include a variety of devices. For example, various controllers in a vehicle may operate as data collectors 110 to provide data 115 via the vehicle 101 network or bus, e.g., data 115 relating to vehicle speed, acceleration, position, system and/or component functionality, etc. Further, other data collectors 110 could include cameras, motion detectors, etc., i.e., data collectors 110 to provide data 115 for evaluating location of a cargo recipient, location of a cargo item 150 in the vehicle 101, etc.

Collected data 115 may include a variety of data collected in a vehicle 101. Examples of collected data 115 are provided above, and moreover, data 115 are generally collected using one or more data collectors 110, and may additionally include data calculated therefrom in the computing device 105, and/or at the server 125. In general, collected data 115 may include any data that may be gathered by the data collectors 110 and/or computed from such data. For example, the computing device 105 may collect data 115 on delivered cargo 150 and receivers thereof, and store the data 115 into a recipient profile stored in at least one of the data store 106 and the server 125.

The system 100 may further include a network 120 connected to a server 125 and a data store 130. The computer 105 may further be programmed to communicate with one or more remote sites such as the server 125, via a network 120, such remote site possibly including a data store 130. The network 120 represents one or more mechanisms by which a vehicle computer 105 may communicate with a remote server 125. Accordingly, the network 120 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, IEEE 802.11, etc.), local area networks (LAN) and/or wide area networks (WAN), including the Internet, providing data communication services.

The server 125 may be programmed to determine an appropriate action for one or more vehicles 101, and to provide direction to the computing device 105 to proceed accordingly. The server 125 may be one or more computer servers, each generally including at least one processor and at least one memory, the memory storing instructions executable by the processor, including instructions for carrying out various steps and processes described herein. The server 125 may include or be communicatively coupled to a data store 130 for storing collected data 115. The server 125 may store a recipient profile that includes data 115, as described above, concerning a recipient location, prior settings for receiving cargo 150, locations of lockers or other storage units accessible by the recipient, etc. The recipient profile may be accessible by a plurality of vehicles 101.

The system 100 may include a user device 135. The user device 135 may be any one of a variety of computing devices including a processor and a memory, e.g., a smartphone, a tablet, a personal digital assistant, etc. The user device 135 may use the network 120 to communicate with the computing device 105 and the server 125. For example, the recipient may use the user device 135 to send a request 140 to the computing device 105 to deliver the cargo.

Figure 2:
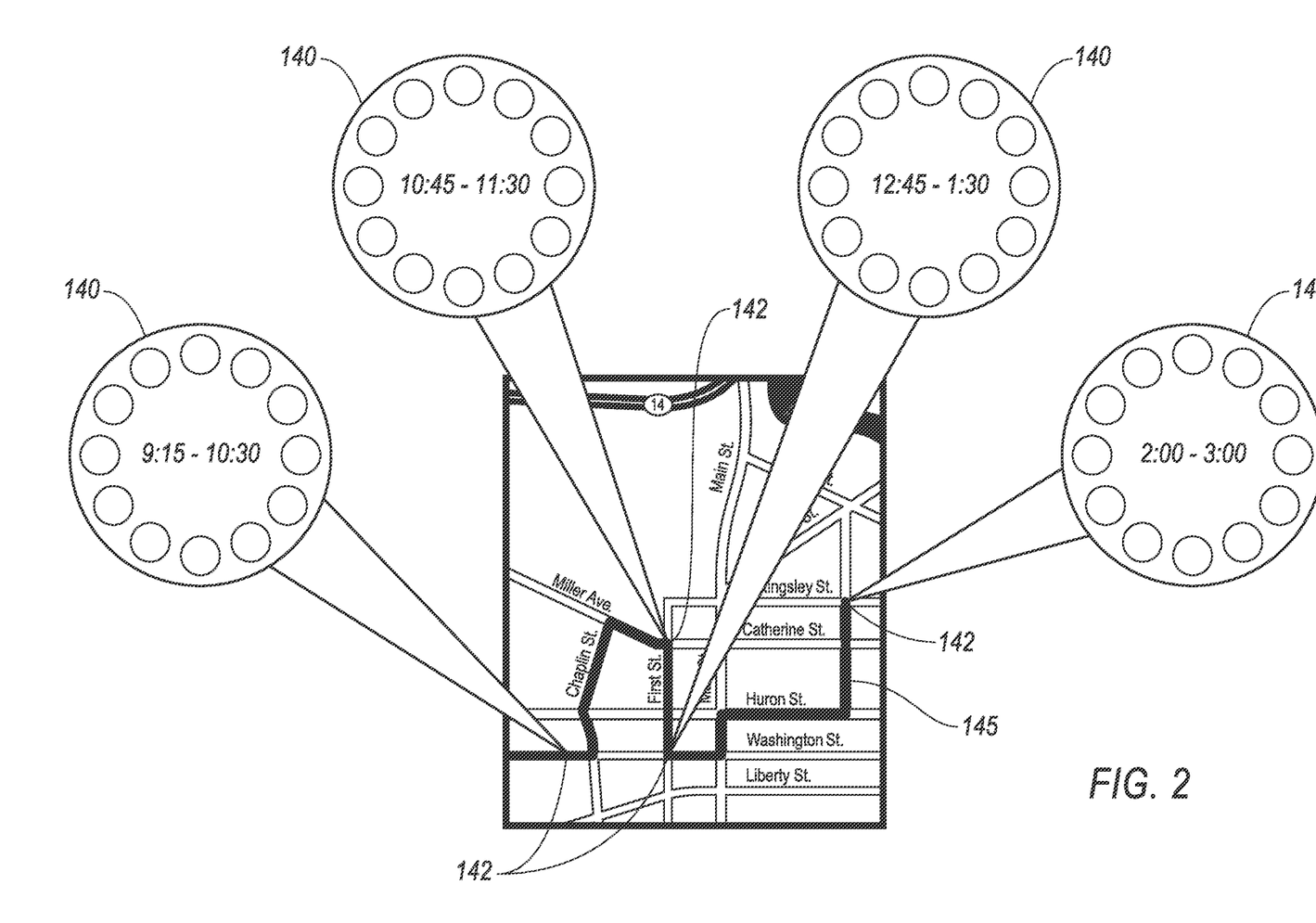
FIG. 2 is a diagram of an example route for an example vehicle of the system of FIG. 1.

FIG. 2 illustrates example requests 140 forming an example route 145. In this example, a plurality of recipients have sent requests 140 for delivery of cargo, in this example packages, 150. Each request 140 indicates a location and a time for receipt of an item of cargo 150 by the recipient. In the example of FIG. 2, the requests 140 each indicate a time range that the recipient is available to collect the cargo 150. For example, the recipient may indicate in the request 140 a time range of 9:15-10:30, a 75 minute window that the recipient will be present at the location to collect the cargo. The computing device 105 receives the requests 140 and determines a stop 142 for each request.

A stop 142 typically defines each of a location and a time or time range at which that the vehicle 101 is estimated or expected to deliver the cargo 150 according to a request 140. Thus, reference to a "requested time" of a stop 142 is to a time for the stop provided in a delivery request. Reference to an "expected time" or "predicted time" of a stop 142 is to an anticipated time, or time range, of the stop 142 once the route 145 has been planned. Based on the times of the stops 142, the computing device may plan the route 145 to move the vehicle 101 to each stop 142, e.g., four stops 142 are shown in FIG. 2. For example, if a delivery request for a first location includes a requested delivery time of 9:15 AM, then a first stop 142 at the first location will be assigned a time range beginning at 9:15 AM, and a second stop 142, at a location with a requested delivery time of 2:00 PM, will be assigned a time range beginning at 2:00 PM. The computing device 105 will accordingly determine the route 145 to move the vehicle 101 to the first stop 142 with the requested time of 9:15 before the second stop 142 with the requested time of 2:00 PM.

Thus, for a plurality of stops 142, the server 125 determines the route 145 that will allow the vehicle 101 to reach all of the locations defined in the stops 142 at the times requested the stops 142. If more than one request 140 indicates times within a time threshold, e.g., 15 minutes, and locations within a distance threshold, e.g., 10 meters, the server 125 may determine one stop 142 for the more than one request 140, and may then communicate to the recipients who sent respective requests 140 the shared stop 142, i.e., an expected time and place for cargo 150 delivery. Thus, requests 140 that are close in location and close in time may be combined into a single stop 142. The server 125 determines the route 145 using known navigation determination techniques, e.g., using global position system (GPS) data 115.

Based on the requests 140, the server 125 may assign items of cargo 150 on a route 145 to be loaded into one of the vehicle 101, i.e., each vehicle 101 may include only cargo 150 for a specific route 145. The server 125 can determine, based on the requests 140, that one route 145 may not deliver the cargo 150 to satisfy all of the requests 140. For example, the times of the requests 140 may be too close for the vehicle 101 to meet all of the times in the requests 140. In another example, the requests 140 may include more cargo 150 than one of the vehicles 101 can hold. The server 125 may send a notification to the recipients who sent the requests 140 to send another request 140 for a different time and/or location, and may suggest a time and location that would fit in the route 145. Alternatively, the server 145 may determine more than one route 145 and may assign the cargo 150 of the requests 140 to more than one vehicle 101, each vehicle 101 following one of the routes 145.

Figure 3:
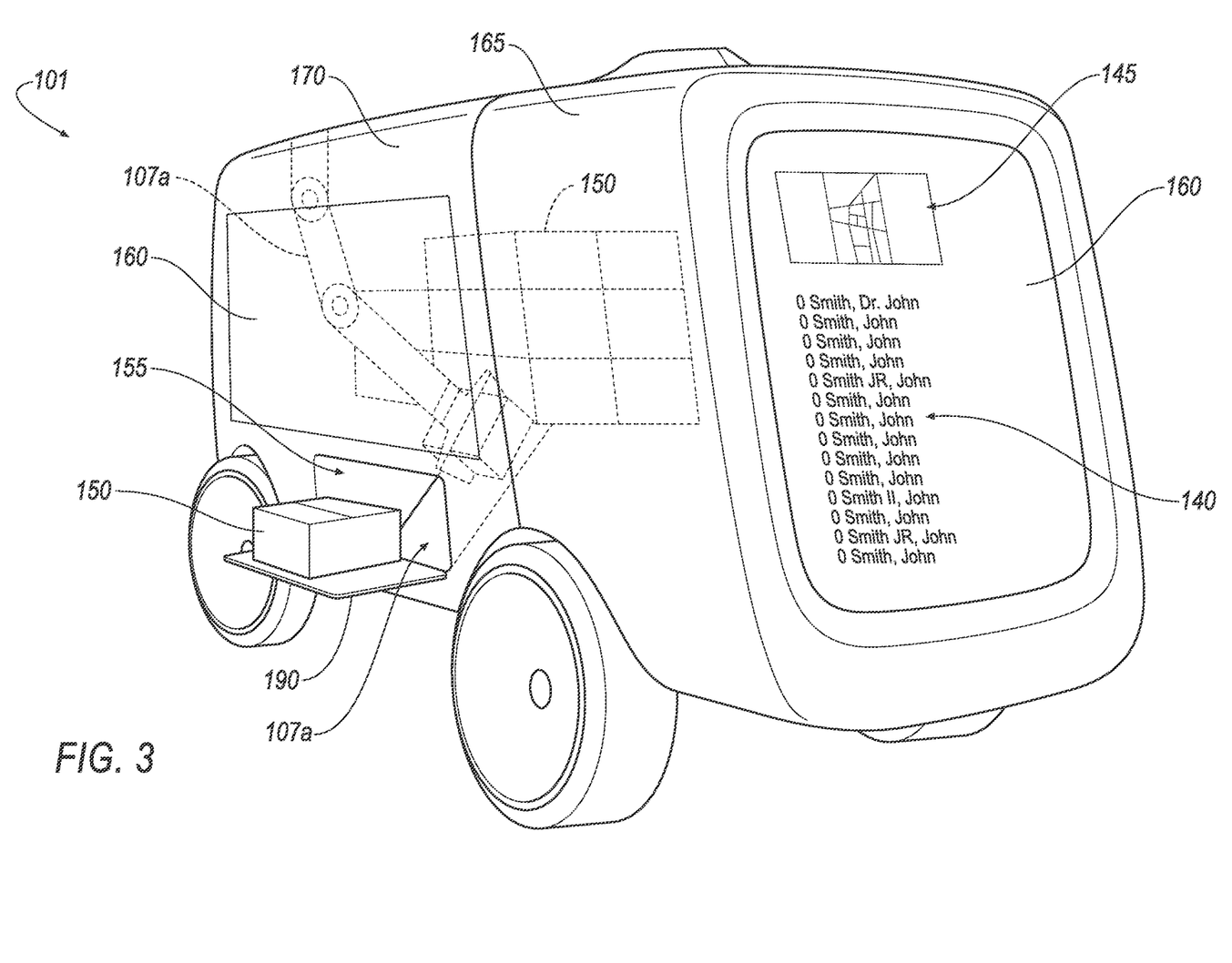
FIG. 3 is a perspective view of an example vehicle of the system of FIG. 1.

FIG. 3 illustrates a perspective view of the example vehicle 101. The vehicle 101 includes a cab 165 attached to a vehicle body 170. The vehicle 101 can include a first display 160 showing a current route 145 and/or requests 140 for cargo 150 delivery. The vehicle 101 may include a second display 160 that displays information specific to a recipient of an item of cargo 150 and/or such information could be provided on the first display. The displays 160 may display information collected from the user devices 135, e.g., recipient names, stop locations, stop times, etc.

Figure 4:
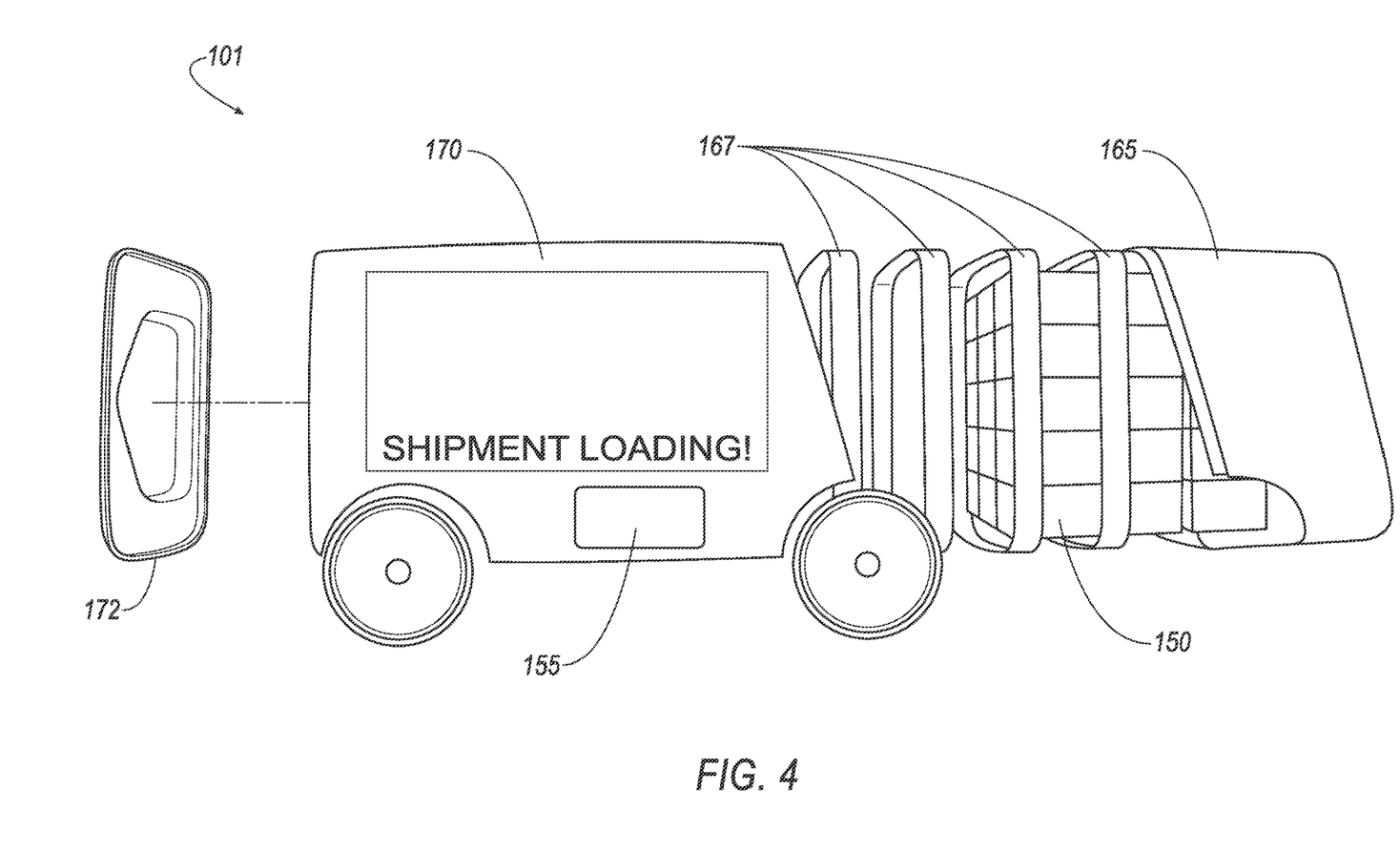
FIG. 4 is an exploded view of the example vehicle of FIG. 3.

The vehicle 101 includes a cab 165. The cab 165 typically provides storage for items of cargo, e.g., packages, 150 and attaches to the vehicle body 170. The cab 165 may include one or more displays 160 mounted thereto to face an exterior thereof for viewing. The cab 165 may be removed from the body 170, as shown in FIG. 4, to load cargo such as packages 150. The cab 165 may include a climate control, e.g., refrigeration, subsystem 107 to, e.g., control an environment of cargo 150, e.g., cargo 150 that is potentially perishable or otherwise sensitive to environmental conditions, e.g., food, pharmaceuticals, fine wine, etc. The cab 165 may be loaded with specific kinds of cargo 150, and the vehicle 101 may be used to vend the cargo 150 as a mobile vending station. For example, the vehicle 101 may be a mobile clothing boutique, sushi vendor, tool rental station, organic food vendor, and/or a coffee vendor. Furthermore, the vehicle 101 may transport occupants as an autonomous law enforcement vehicle 101, an emergency assistance vehicle 101, and/or an ambulance. Further still, the vehicle 101 may be used for transporting occupants in a ride-sharing system.

The vehicle 101 includes the vehicle body 170. The body 170 houses one or more vehicle subsystems 107, e.g., a propulsion subsystem, a steering subsystem, vehicle 101 wheels, etc. In the examples of FIGS. 3-7, the body 170 typically houses the subsystems 107 to propel and steer the vehicle 101 and the cab 165 typically houses the cargo 150 to be delivered. Thus, cargo 150 can be added to the vehicle 101 by replacing a first cab 165 with no cargo 150 with a second cab 165 with cargo 150 onto the body 170. This allows the vehicle 101 to use the same body 170 to transport a plurality of cabs 165, including cabs 165 installed with, e.g., a climate control subsystem 107. The body 170 may include one or more displays 160.

The body 170 includes an opening 155 that allows a cargo movement subsystem 107a to move the cargo 150 out from the body 170 to a recipient. The body 170 houses the cargo movement subsystem 107a to move items of cargo 150 from the cab 165 to the opening 155. The opening 155 allows the cargo moving subsystem 107a to move the cargo 150 from the cab 165 to the recipient outside of the vehicle 101. The cargo movement subsystem 107a may include a conveyor belt, a robot arm, and/or a movable shelf 190 that in a closed position flush is substantially flush with the body 170 in the opening 155. The shelf 190 can be actuated by the computer 105 to move to an open position substantially perpendicular to the body 170, e.g., extending from the opening 155 (see FIG. 5). The cargo 150 may be conveyed to the shelf 190 in the open position, e.g., by a conveyor belt, robot arm, etc., where the recipient may collect the cargo 150.

For example, as shown in FIG. 3, the cargo movement subsystem 107a may include a robot arm and a conveyor belt, the robot arm moving one of the cargo packages 150 from a stack of cargo 150 onto the conveyor belt that delivers the cargo 150 onto the shelf 190. The robot arm may include known grasping devices arranged to grasp and release the cargo 150, e.g., a claw, a pincer, a vacuum attachment, etc. The robot arm may further have a known configuration including a plurality of links arranged to move the grasping devices to the cargo 150, the links rotatably connected with, e.g., universal joints, hinges, etc., and movable with, e.g., motors, cables, pulleys, etc. The robot arm may be attached to the body 170 at, e.g., a roof, a wall, a floor, etc.; for example, one of the links may be rotatably attached to the interior roof of the body 170. The rotatably attached links allow the robot arm to move throughout the interior of the body 170. The robot arm may further include a known sensor to identify a specific piece of cargo 150 to move to the conveyor belt, e.g., a barcode scanner, a quick response (QR) code scanner, a camera arranged to read a label on the cargo 150, etc. FIG. 3 shows an example of the robot arm including the pincer including a pair of arms and a motor arranged to move the arms of the pincer to grasp and release the sides of the cargo 150.

The conveyor belt may include a belt rotatably attached to at least two pulleys and a motor arranged to rotate one of the pulleys to move the belt. The belt may include a textured surface to secure the cargo 150 and prevent the cargo 150 from slipping off of the shelf 190. The conveyor belt may extend from the stack of cargo 150 to the opening 155 and/or to the shelf 190. The conveyor belt may move the cargo 150 to the shelf 190 for the cargo recipient to retrieve the cargo 150. If the cargo recipient does not remove the cargo 150 from the shelf 190 in a predetermined period of time, the conveyor belt may return the cargo 150 from the shelf 190 and the robot arm may move the cargo 150 from the conveyor belt onto the stack of cargo 150.

FIG. 4 illustrates an exploded side view of the example vehicle 101. Here, the cab 165 is separated from the body 170, e.g., to load cargo 150. The vehicle 101 may include support rings 167 connecting the cab 165 to the body 170. The support rings 167 may provide increased strength to the body 170 and the cab 165, and may guide the cab 165 while the cab 165 is being attached to the body 170. When the vehicle 101 returns from a first route 145 to receive additional cargo 150, e.g., for delivery on a second route 145, a first cab 165 may be removed from the body 170 and replaced with a second cab 165 with additional cargo 150 for delivery on the second route 145. The vehicle 101 may then receive instructions from the server 125, including the route 145 determined for the requests 140 for the respective new cargo 150.

The vehicle 101 may include an end plate 172 attached to the vehicle body 170. The end plate 172 encloses the vehicle body 170 opposite the cab 165. The end plate 172 may be removed from the body 170 to, e.g., access cargo 150 in the cab 165.

Figure 5:
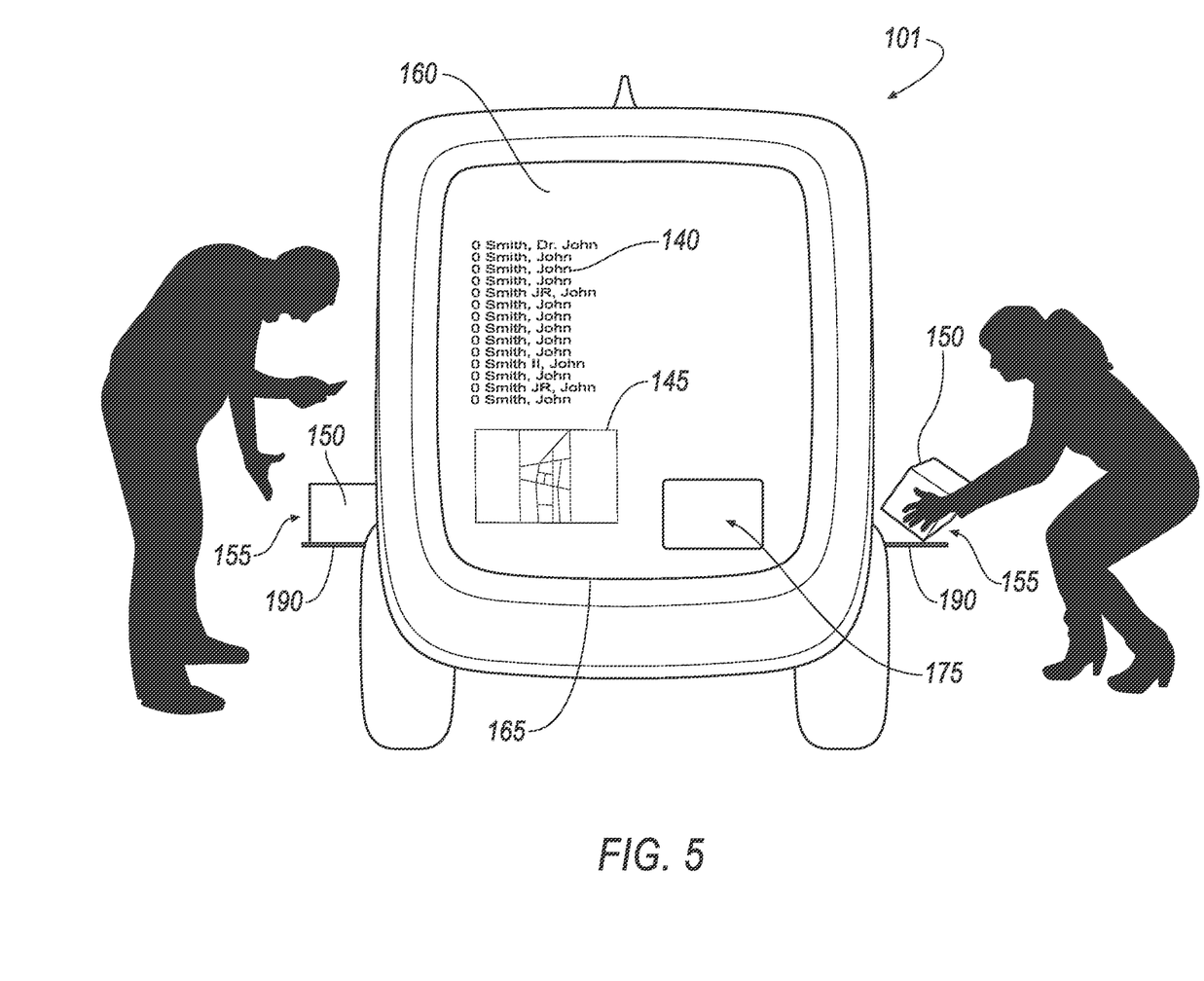
FIG. 5 is a view of the example vehicle of FIG. 3 delivering cargo to recipients.

FIG. 5 illustrates the vehicle 101 with recipients collecting cargo 150. Here, the vehicle 101 includes two openings 155, each providing a package 150. An item of cargo such as a package 150 can be placed on the shelf 190, from which a recipient can collect the packages 150. Openings 155 may be positioned in various places, e.g., on opposite sides of the body 170, to allow more than one recipient to collect packages 150 without obstructing other recipients. As seen in FIG. 5, a display 160 mounted to a face of the cab 165 shows the route 145 and the requests 140, as described above in the example of FIG. 3.

The cab 165 may include a return opening 175. In addition to collecting packages 150, it is possible that recipients may return cargo 150 to the vehicle 101. For example, the package 150 collected may not be the correct package 150 for that specific recipient. In another example, the recipient may want to send a first package 150 instead of or addition to collecting second package 150. The return opening 175 may open from a closed position substantially flush with the cab 165 to an open position at a substantially nonzero angle with the cab 165 to allow the recipient to place the package 150 in the cab 165.

Figure 6:
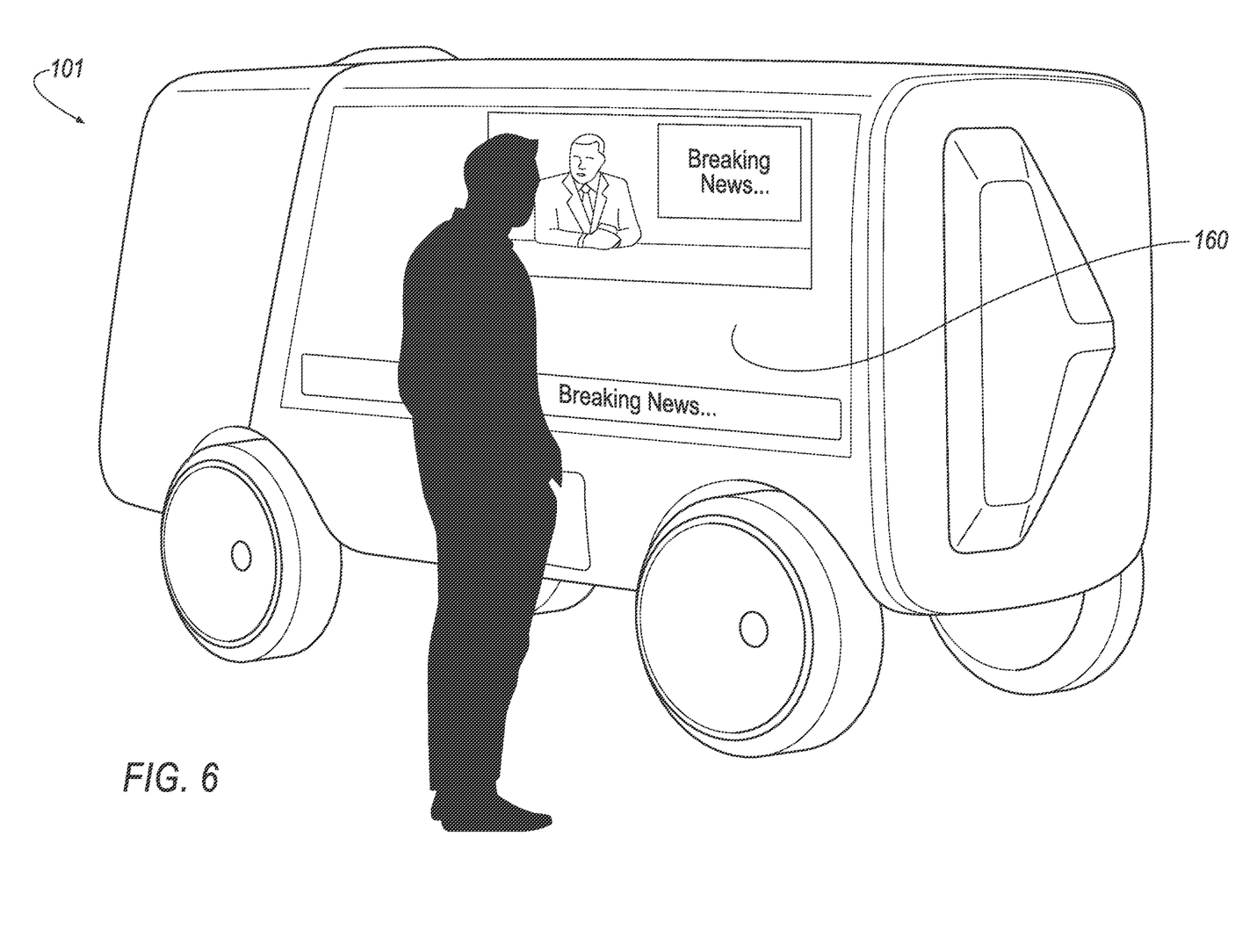
FIG. 6 is a view of the example vehicle of FIG. 3 displaying information to the recipient of one of the items of cargo.

FIG. 6 illustrates the example vehicle 101 and example of a display 160. In addition to displaying information about the packages 150, the route 145, etc., the computing device 105 may collect data 115 from, e.g., an entertainment service, a news service, etc., and display the data 115 to the recipients on the display 160. For example, the computing device 105 may display a stream of a news report on the display 160.

Figure 7:
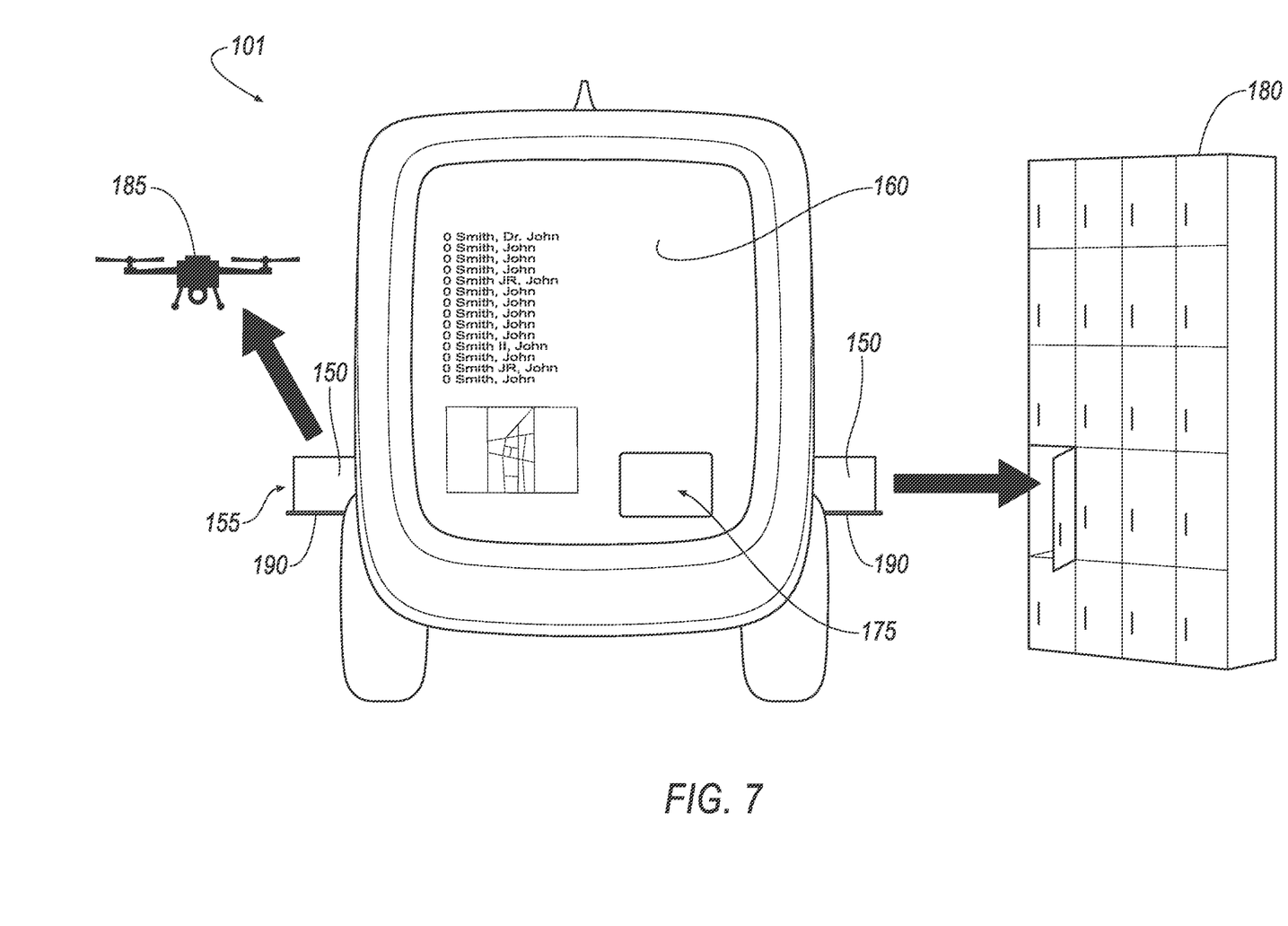
FIG. 7 is a view of the example vehicle of FIG. 3 delivering the cargo to a locker and an unmanned aerial vehicle.

FIG. 7 illustrates the example vehicle 101 providing cargo 150 for retrieval by recipients. Alternatively or additionally, the vehicle 101 may move the cargo 150 to storage unit or the like, e.g., a locker 180, for retrieval by a recipient. The locker 180 may have a lockable door openable with a code sent to a user device 135. The cargo moving subsystem 107, e.g., a conveyor and/or robot arm, may move the cargo 150 from the cab 165 to the locker 180, which is locked so that the recipient may collect the cargo 150 at a later time. The computing device 105 may then send the code to unlock the locker 180 to the device 135. The request 140 may include a specific locker 180 for the vehicle 101 to place the cargo 150. Alternatively, the vehicle 101 may deliver the cargo 150 to a user device 135 of a locker operator who can place the cargo 150 in the locker 180.

The vehicle 101 may further make a cargo 150 available for retrieval by an unmanned aerial vehicle (UAV) 185. Because vehicle 101 may not be able to reach a location of the recipient of the cargo 150, the UAV 185 may deliver the cargo 150 from the vehicle 101 to the recipient. The UAV 185 may be a known aerial vehicle programmed to operate with substantially no human input. The UAV may move the cargo 150 from the opening 155 to the recipient. The computing device 105 may send a notification to the recipient indicating that the UAV 185 has collected the cargo 150 and is moving toward the recipient.

Figure 8:
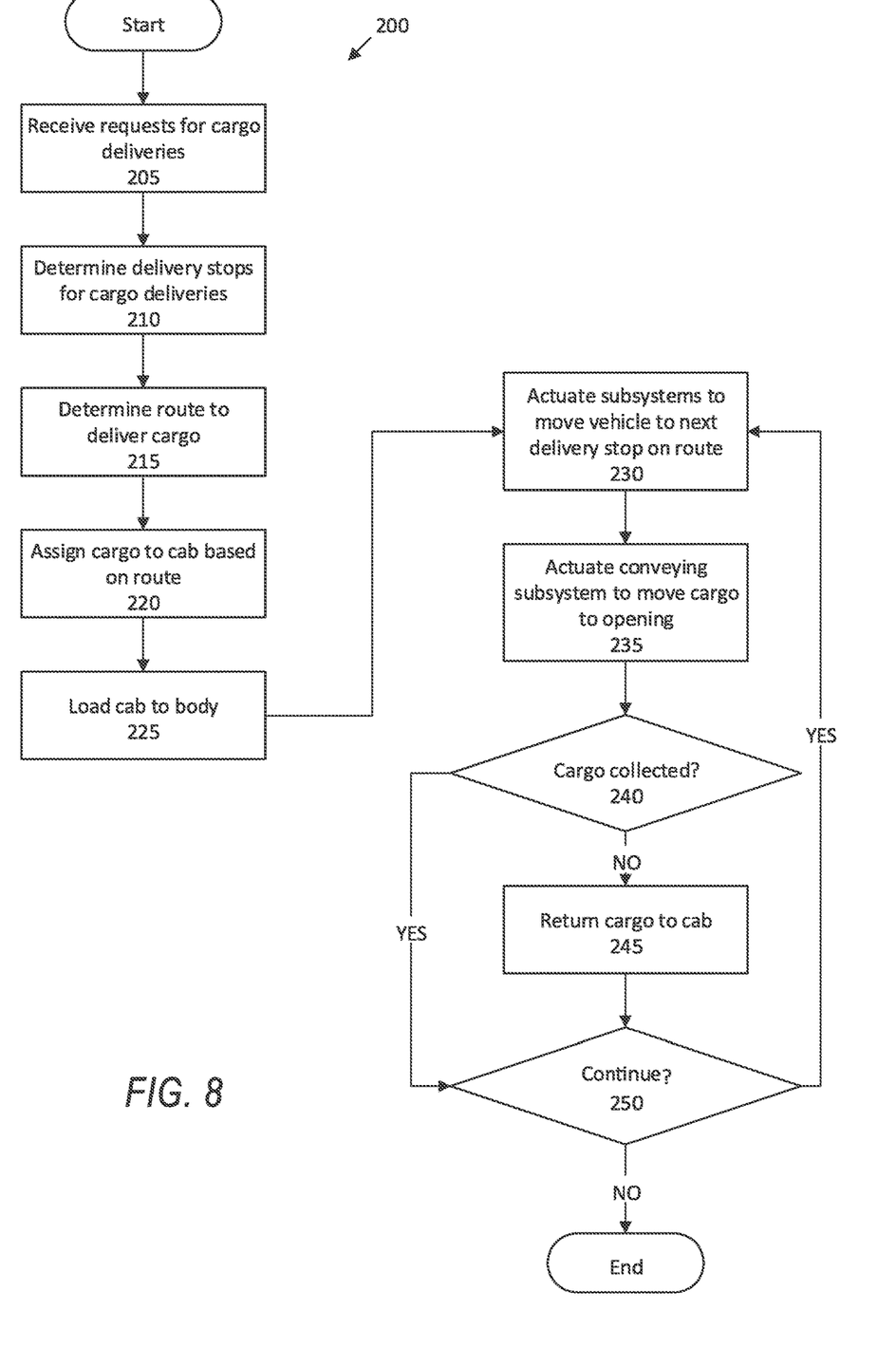
FIG. 8 is an example process for executed within the cargo transportation system of FIG. 1.

FIG. 8 illustrates an example process 200 for delivering cargo 150. The process 200 begins in a block 205, in which the server 125 receives a plurality of requests 140 for items of cargo 150 to be delivered. The requests 140 may be sent by recipients on user devices 135. The requests 140 include the identification of the cargo 150 to be delivered, the location to deliver the cargo 150, and the time that the recipient is available to receive the cargo 150. The request 140 may further include an identification of the locker 180 for the vehicle 101 to deliver the cargo 150, as described above, or an indication to actuate the UAV 185 to deliver the cargo 150.

Next, in a block 210, the server 125 determines a stop 142 for each of the requests 140. The stops 142, as explained above, indicate locations, based on locations identified in the requests 140, for the respective items of cargo 150 to be delivered and the times that the items of cargo 150 are to be delivered. As also described above, the server 125 may select a stop 142 for more than one request 140 if the locations identified in the requests 140 are within a distance threshold, e.g., 10 meters, 50 meters, etc., and if the times identified in the requests 140 are within a time threshold, e.g., 15 minutes.

Next, in a block 215, the server 125 determines at least one route 145 based on the stops 142. The route 145 includes directions for the computing device 105 to actuate the vehicle subsystems 107 to move the vehicle 101 to each stop. The server 125 determines the route 145 using route planning techniques such as are known to arrive at each location of the stop at the time specified in the stop.

Next, in a block 220, the server 125 assigns the cargo 150 to one of the cabs 165 based on the route 145. As described above, a single vehicle 101 may by unable to transport all of the cargo 150 requested in the requests 140. The cab 165 may not fit enough cargo 150 for the entire route 145, or the vehicle 101 may not be able to deliver all of the cargo 150 at the requested times. The server 125 assigns each of one or more items of cargo 150 on each of the routes 145 to one of one or more cabs 165 to deliver each item of cargo 150 according to the requests 140. The server 125 then sends an instruction to load each item of cargo 150 into the a specified one of the one or more cabs 165, e.g., the server 125 sends the instruction to a user device 135 of a human operator, to a cargo movement subsystem 107a, etc.

Next, in a block 225, the server 125 sends an instruction to load the cab 165 to the body 170. The server 125 may send the instruction to a user device 135 of a vehicle 101 operator to manually load the cab 165 to the body 170, and/or the server 125 may instruct the computing device 105 to move the body 170 toward the cab 165 to load the cab 165 onto the body 170, forming the vehicle 101.

Next, in a block 230, the server 125 instructs the computing device 105 to actuate one or more vehicle subsystems 107. e.g., propulsion, braking, and steering, to move the vehicle 101 to a next stop in the route 145. For example, the computing device 105 may actuate the propulsion subsystem 107 to propel the vehicle 101 toward the next stop 142 and then actuate the brake subsystem 107 to stop the vehicle 101 at the stop 142.

Next, in a block 235, the computing device 105 actuates the cargo movement subsystem 107a to provide the cargo 150 to the recipient. The computing device 105 could, for example, actuate a robot arm of the cargo movement subsystem 107a to move the cargo 150 from the cab 165 to the opening 155 for the recipient to collect. The computing device 105 may alternatively or additionally, as described above, actuate the cargo moving subsystem 107 to move the cargo 150 to the locker 180 or to the UAV 185.

Next, in a block 240, the computing device 105 determines whether the cargo 150 was collected. For example, a camera 110 may collect visual data 115 of the opening 155 and the computing device 105 may determine whether the cargo 150 was collected based on whether the visual data 115 show the cargo 150 collected by the recipient. In another example, if the cargo moving subsystem 107 moves the cargo 150 to the locker 180, the computing device 105 determines that the cargo 150 was collected when the cargo 150 is moved into the locker 180. If the cargo 150 was collected, the process 200 continues in a block 250. Otherwise, the process 200 continues in a block 245.

In the block 245, the computing device 105 actuates the cargo movement subsystem 107a to return the cargo 150 from the opening 155 to the cab 165. The cargo 150 may not be collected because, e.g., a recipient is not present. Because the route 145 is typically planned on the assumption that the vehicle 101 will leave a first stop and proceed to a next stop within a certain amount of time after arriving at the first stop, the computing device 105 may actuate the cargo moving subsystem 107 to return the cargo 150 to the cab 165 after a predetermined period of time rather than delay the vehicle 101 and potentially cause the vehicle 101 to arrive after a planned time at the next stop 142 in the route 145.

In the block 250, the computing device 105 determines whether to continue the process 200. For example, if the route 145 has no more stops and/or no more cargo 150 to deliver, the computing device 105 may determine to end the process 200 until more requests 140 are received. In another example, the route 145 may still have stops remaining, so the computing device 105 determines to continue the process 200. If the computing device 105 determines to continue, the process 200 returns to the block 230 to move to the next stop. Otherwise, the process 200 ends.

Figure 9A:
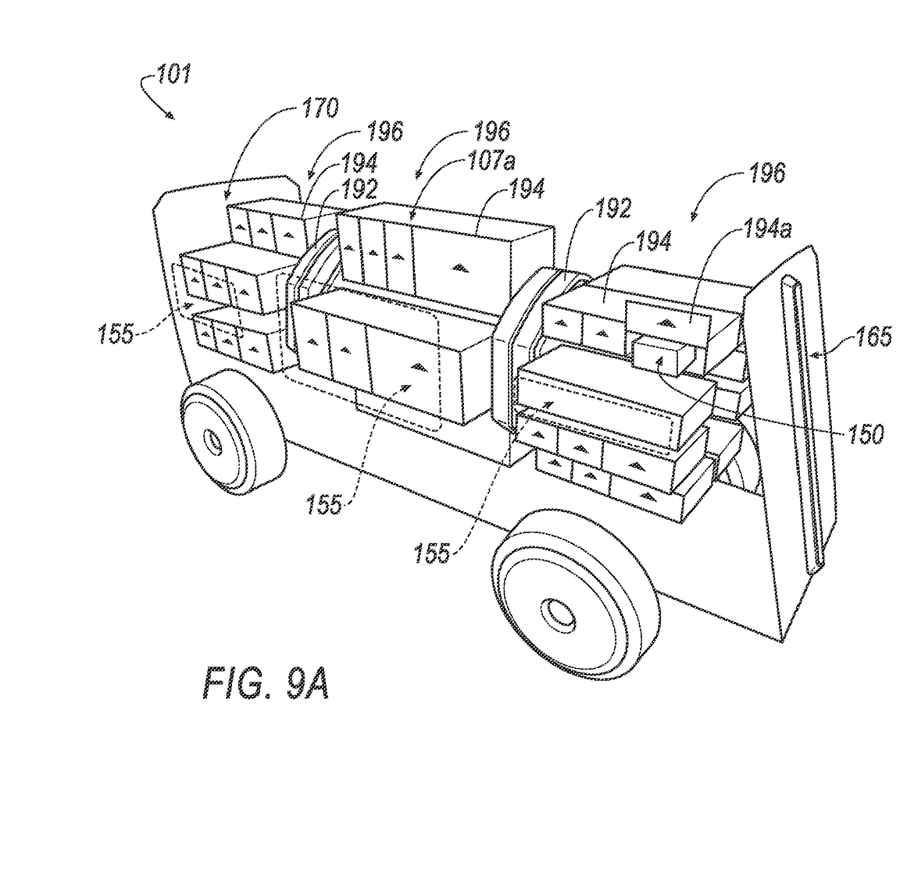
FIGS. 9A and 9B illustrate another example vehicle and a cargo movement subsystem.
Figure 9B:
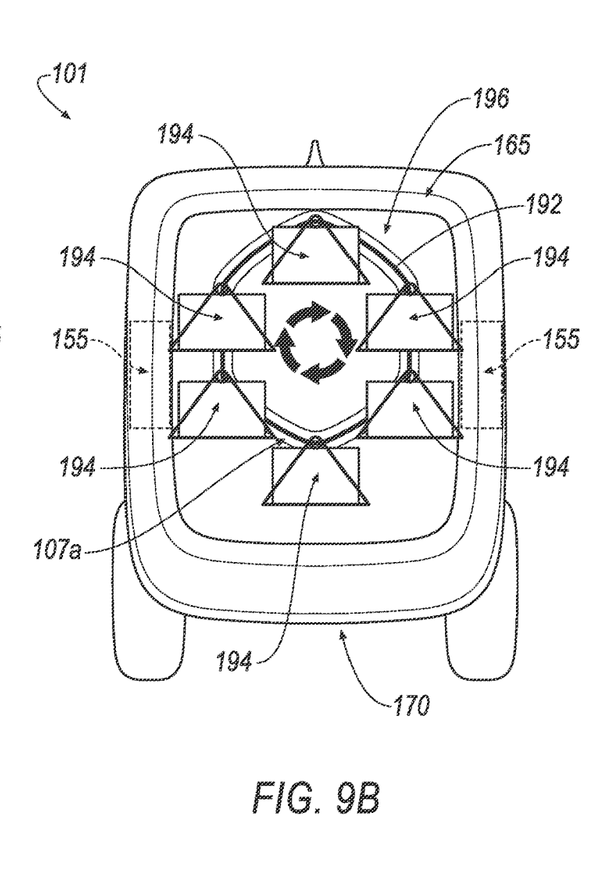

FIGS. 9A and 9B illustrate another example vehicle 101 including another example cargo movement subsystem 107a. The cargo movement subsystem 107a of FIGS. 9A and 9B includes a rotatable carriage 192 rotatably attached to the cab 165 and a plurality of containers 194 disposed on the rotatable carriage. Each of the containers 194 may include a piece of cargo 150. The rotatable carriage 192 rotatably houses the containers 194, which allows the containers 194 to hang down regardless of the position of the rotatable carriage 192. The cargo movement subsystem 107a may include a motor (not shown) arranged to rotate the rotatable carriage 192. As shown in FIG. 9A, the containers 194 may each have a door 194a that opens to allow access to the cargo 150 stored within and that typically is closed when the rotatable carriage 192 is in motion. Furthermore, the rotatable carriage 192 of FIG. 9A includes three sections 196 supported by the cab 165, each section 196 including six sets of containers 194 (as shown in FIG. 9B) arranged substantially around a circumference of a circle. Each section 196 of the rotatable carriage 192 may be independently rotatable to align with one or more of the openings 155, allowing cargo recipients to receive cargo 150 from each of the openings 155 independently of the other opening 155. The vehicle 101 may include a different number of openings 155 arranged for a different number of sections of the cargo movement subsystem 107a. As shown in FIG. 9B, the rotatable carriage 192 rotates until the container 194 that has the requested piece of cargo 150 is positioned adjacent to one of the openings 155. The container 194 then opens its respective door 194a to allow the cargo recipient access to the cargo 150 stored within. FIG. 9B shows one section 196 of the rotatable carriage 192 that rotates containers 194 to two opposing openings 155.

Figure 10A:
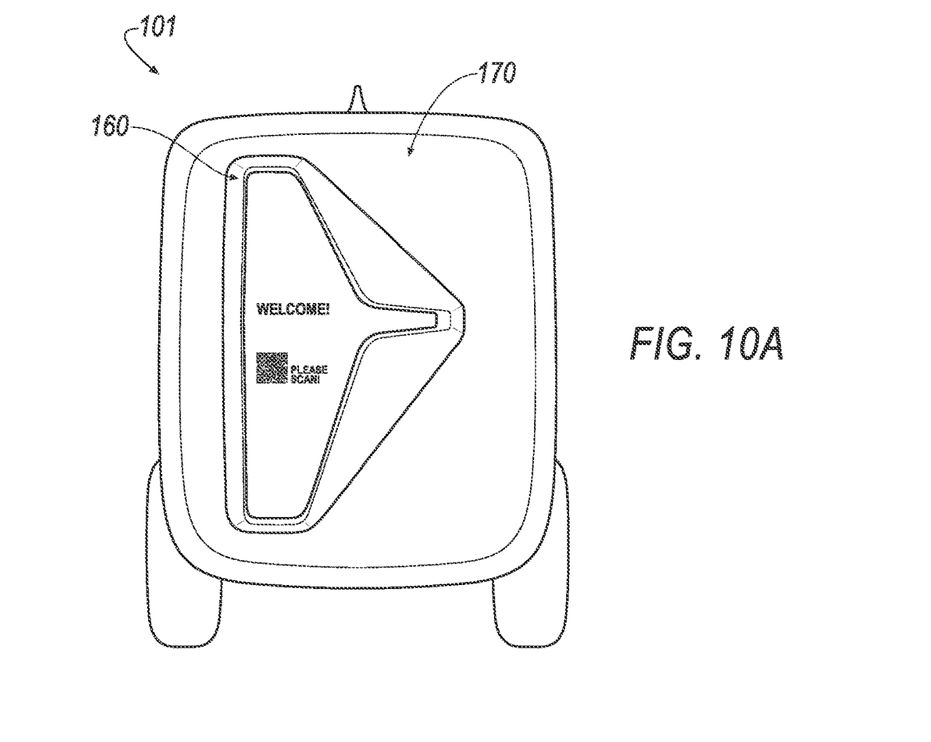
FIGS. 10A and 10B illustrate a display on the example vehicle of FIGS. 9A-9B displaying information of one of the items of cargo.
Figure 10B:
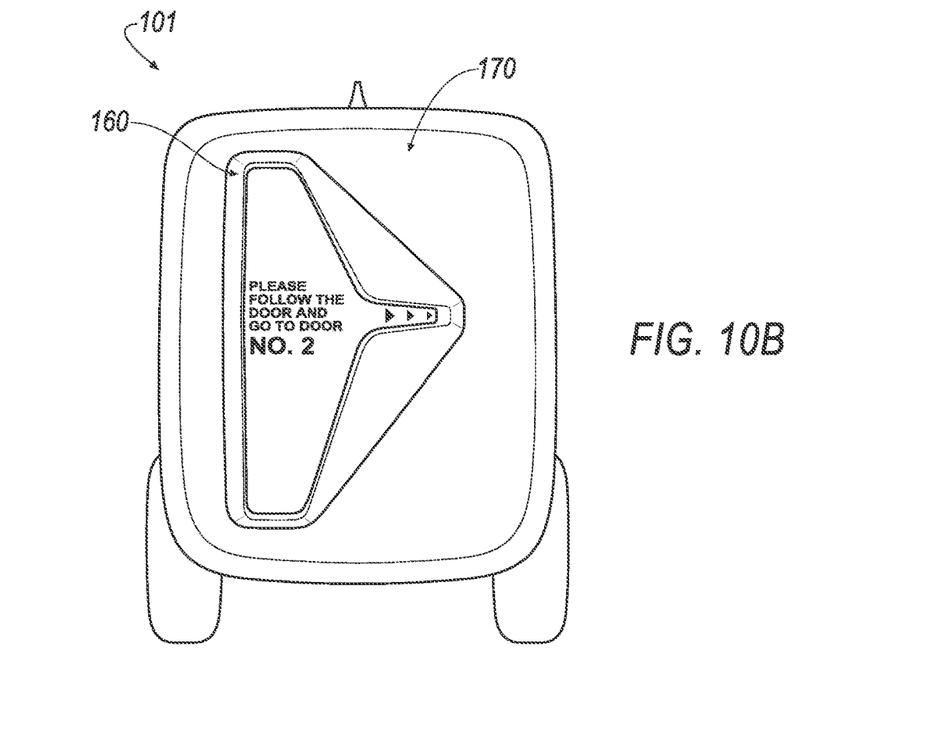

FIGS. 10A and 10B illustrate an example display 160 on the body 170. The display 160 provides information to the cargo recipients. As shown in FIG. 10A, the display 160 may identify an identifying code, e.g., a barcode, a QR code, etc., provided by the cargo recipient to identify the cargo 150. Upon identifying the cargo 150, the cargo movement subsystem 107a may determine the container 194 that houses the cargo 150, rotate the rotatable carriage 192 so that the container 194 is adjacent to one of the openings 155, and identify the opening 155 on the display 160 for the cargo recipient. The cargo recipient then moves to the opening 155 to receive the cargo 150.

Figure 11:
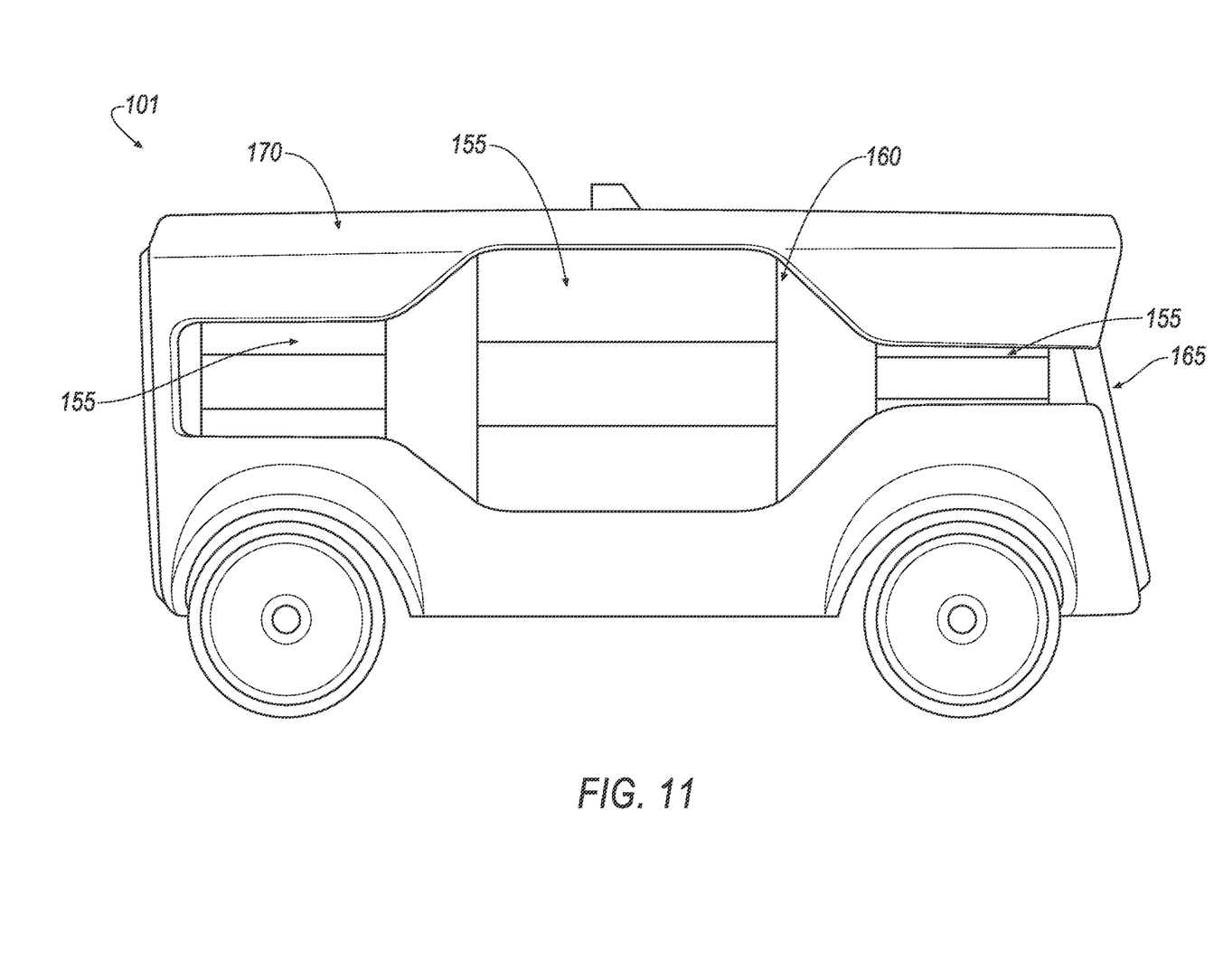
FIG. 11 illustrates the example vehicle of FIGS. 9A-9B with openings arranged to deliver the cargo.

FIG. 11 illustrates the vehicle 101 in a side view, showing the openings 155. The cab 165 may include a plurality of openings 155, each opening 155 including a sliding door that allow the cargo recipient to receive the cargo 150 from the opening 155. The cab 165 may include a display 160 that identifies the opening 155. For example, the display 160 of FIGS. 10A-10B on the end of the cab 165 may identify one of the opening 155 for the cargo recipient to receive the cargo 150. The display 160 on the side of the cab 165 may show the identified opening 155 for the cargo 150. The openings 155 may be sized based on the cargo 150 stored within. e.g., one of the openings 155 may be larger than the other openings 155 to accommodate larger cargo 150, while the other openings 155 may accommodate smaller cargo 150.

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, sensor measurements, computations, processing time, communications time, etc.

Computing devices 105 generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device 105 is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 200, one or more of the steps could be omitted, or the steps could be executed in a different order than shown in FIG. 8. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The invention claimed is:

1. A system, comprising:
a vehicle including:
   a body including an opening and a shelf attached to the opening,
   a removable cab attachable to the body, and
   an arm arranged to move cargo from the cab through the opening to a position accessible from an exterior of the vehicle; and
a computing device including a processor and a memory, the computing device programmed to:
   receive a request to deliver the cargo stored in the cab, the request including a time and a location to deliver the cargo;
   actuate, based on the request, the arm to move the cargo through the opening;
   actuate the arm to move the cargo from the cab to the shelf; and
   actuate the arm to move the cargo from the shelf to the cab when the cargo is not collected within a predetermined period of time.

2. The system of claim I, wherein the computing device is programmed to determine a route based on the request and to assign the cargo to the cab based on the route.

3. The system of claim 2, wherein the computing device is programmed determine a plurality of routes upon receiving a plurality of requests.

4. The system of claim 2, wherein the computing device is programmed to actuate at least one vehicle component to move the vehicle along the route.

5. The system of claim 1, wherein the cab includes a climate control component.

6. The system of claim 1, wherein the computing device is programmed to actuate the arm to move the cargo from the cab to a locker.

7. The system of claim 1, wherein the computing device is programmed to instruct an unmanned aerial vehicle to deliver the cargo from the cab to a cargo recipient.

8. The system of claim 1, further comprising a display disposed on at least one of the cab and the body.

9. A vehicle, comprising:
a body including an opening and a shelf attached to the opening;
a removable cab attachable to the body;
an arm arranged to move cargo from the cab through the opening to a position accessible from an exterior of the vehicle; and
a computing device including a processor and a memory, the computing device programmed to:
   actuate at least one vehicle component to move the vehicle;
   actuate the arm to move the cargo through the opening;
   actuate the arm to move the cargo from the cab to the shelf; and
   actuate the arm to move the cargo from the shelf to the cab when the cargo is not collected within a predetermined period of time.

10. The vehicle of claim 9, wherein the cab includes a climate control component.

11. The vehicle of claim 9, wherein the computing device is programmed to actuate the at least one vehicle component to move the vehicle according to a route received from a server.

12. The vehicle of claim 9, wherein the computing device is programmed to actuate the arm to move the cargo from the cab to a locker.

13. The vehicle of claim 9, wherein the computing device is programmed to instruct an unmanned aerial vehicle to deliver the cargo from the cab to a cargo recipient.

14. The vehicle of claim 9, further comprising a display disposed on at least one of the cab and the body.

15. The vehicle of claim 9, further comprising a removable end plate attached to the body opposite the cab.

* * * * *

UNITED STATES PATENT AND TRADEMARK OFFICE
CERTIFICATE OF CORRECTION

PATENT NO. : 11,237,569 B2
APPLICATION NO. : 16/087635
DATED : February 1, 2022
INVENTOR(S) : Euishik Bang et al.

It is certified that error appears in the above-identified patent and that said Letters Patent is hereby corrected as shown below:

In the Claims

Claim 2, Column 11, Line 36: replace "claim I" with "--claim 1--"

Claim 3, Column 11, Line 40: replace "programmed determined" with "--programmed to determine--"

Signed and Sealed this
Thirtieth Day of July, 2024

Katherine Kelly Vidal
*Director of the United States Patent and Trademark Office*